UNITED STATES PATENT OFFICE.

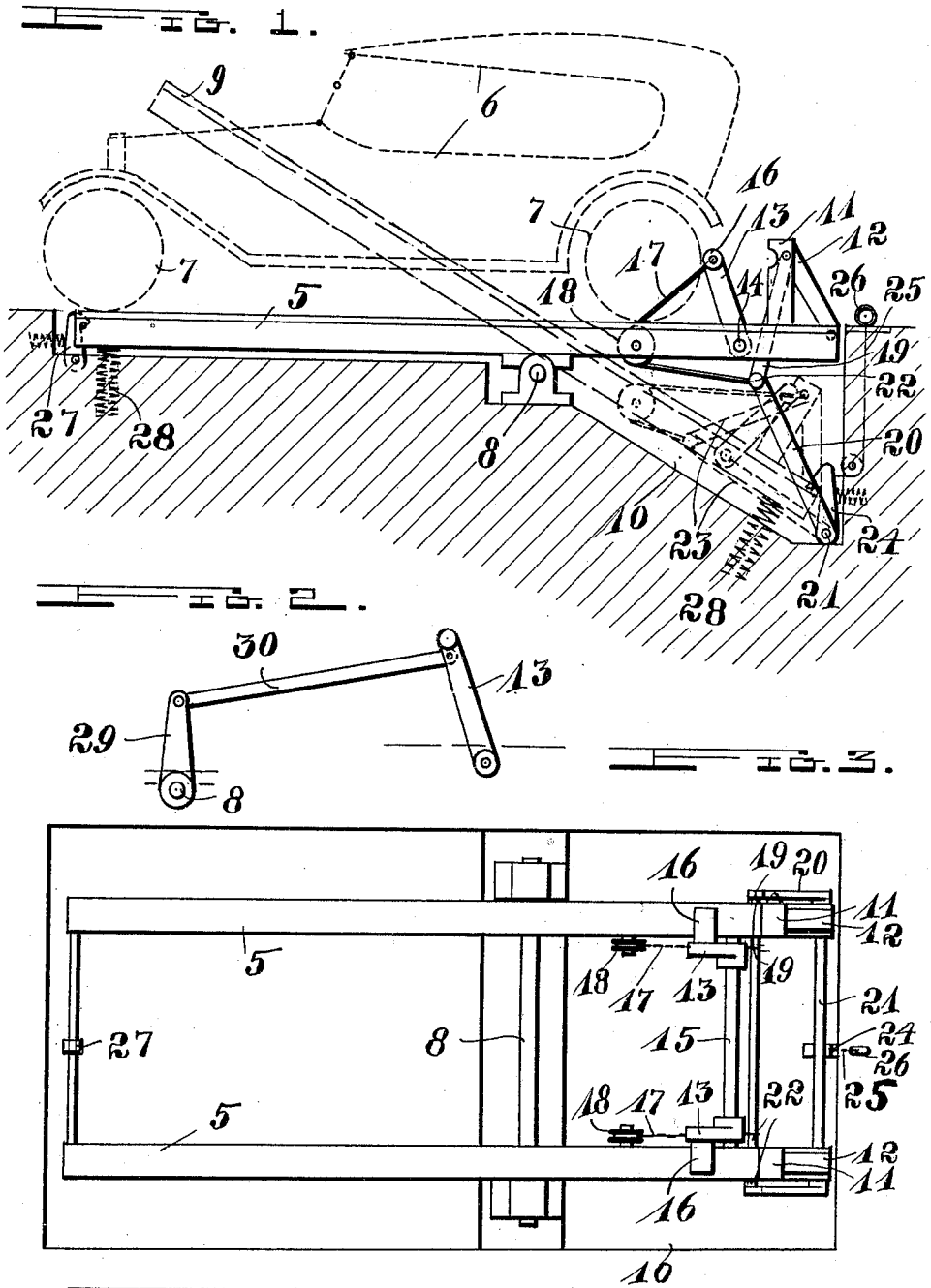

OVID LAWS, JR., OF LOS ANGELES, CALIFORNIA.

TILTING AUTOMOBILE SCAFFOLD.

1,410,197.

Specification of Letters Patent. Patented Mar. 21, 1922.

Application filed January 12, 1921. Serial No. 436,814.

*To all whom it may concern:*

Be it known that I, OVID LAWS, Jr., a citizen of the United States, residing at Los Angeles, in the county of Los Angeles and State of California, have invented a new and useful Tilting Automobile Scaffold, of which the following is a specification.

This invention relates to devices for putting automobiles in a position so that a mechanic can readily reach parts on the underside of such automobiles.

One of the objects of this invention is to avoid working in pits when repairing parts on the underside of automobiles.

Another object is to make the underside and thereby all parts located in and near the underside of an automobile easily accessible to a mechanic when repairing or examining such automobiles.

Another object is to provide a tiltable driveway so that an automobile may be driven up to the driveway and then tilted so that the underside of the automobile is lifted enough that a mechanic may look under in a convenient manner.

Another object is to provide such a driveway and device with means for tilting and operating the driveway.

Another object is to provide cushioning means for the movements of such a driveway.

Other objects will appear from the following description and appended claims as well as from the accompanying drawing, in which—

Fig. 1 is a side elevation of the device in a position ready to receive an automobile, an automobile being illustrated in dotted lines approaching the operating mechanism for tilting the device, the tilted position of the device being also indicated in dotted lines.

Fig. 2 is a fragmentary detail side elevation of operating means for the device in slightly modified form.

Fig. 3 is a top plan view of the device.

Fig. 4 is a fragmentary detail side elevation of operating mechanism for the device in a modified form for manually handling the device for the tilting operations.

The track 5, illustrated in Figs. 1 and 3, is designed to receive and support an automobile. In Fig. 1, an automobile is indicated in dotted lines at 6 with the wheels 7 standing on the track 5. The track is preferably made of two spaced members as clearly illustrated in Fig. 3, both members jointly mounted on a common shaft 8, so that both members can be evenly and equally moved and swung around the shaft, eventually to the position indicated in dotted lines at 9.

It is a well known fact that it is rather difficult to repair or examine many parts of an automobile because such parts are on or in the underside of the automobile, or at least below the body of the automobile. The most common arrangement in use is a pit of a depth that a person can stand upright in the pit below the automobile to be able to look up towards the underside of the automobile. Another arrangement, almost as popular, is a scaffold of a height that a person can stand on the ground to be able to look up towards the underside of an automobile, the automobile being placed on top of the scaffold. Such scaffolds are usually provided with an inclined driveway so that an automobile can be driven up to the top of the scaffold. The scaffold, eventually of less height, is very often used in conjunction with a pit, the pit being in such a case of less depth, so that the depth of the pit and the height of the scaffold together measure up to such an extent that a person can stand in the pit below the automobile on the scaffold in an upright position.

All such arrangements, however, require a person to look up towards the underside of the automobile, and that in a rather awkward, inconvenient, and tiresome manner to the person.

The device, disclosed in this application, is intended to serve so that a person may look practically in a forward direction towards the parts on the underside of an automobile. The device is furthermore designed to require less pit construction, since the automobile with the device is lifted from the ground in such a manner as to allow a person to reach the desired parts of the automobile.

In Fig. 1, the automobile indicated in dotted lines at 6, is illustrated with its rear end towards the operating mechanism, but it will easily be understood that the automobile can be placed on the device in a reversed manner so that the front comes towards the end in which the rear end is now illustrated.

A pit 10 is provided, but this pit is proportionally small, and mainly contains the operating mechanism, at least as illustrated in Fig. 1.

The shaft 8 is shown as not quite in the middle of the track members 5, but this also may easily be modified without departing from the principle of the invention, the track members, and therewith the whole device (even taking an automobile into consideration) may easily be balanced, as will easily be understood.

When an automobile is so tilted, it must naturally be held and supported, this is done by having a stop provided on the track members, the uprights 11 with the braces 12 serve as such stop members.

For operating the device by the power of an automobile, a lever, or a lever on each track member, indicated at 13, is provided swingably engaging with the track member at 14. In Fig. 3, two such levers 13 are illustrated mounted on a common shaft 15. Side extension ends 16, provided on the upper free ends of the levers 13 project over the track members into the path of the wheels of an automobile when driven over the track members of this device. If an automobile, therefore, is driven up towards the stop 11, the wheels 7 of the automobile 6 naturally approach the levers 13 first. On pressing on, the levers 13 are swung in the direction towards the stop 11. This motion is used in the arrangement illustrated in Fig. 1 by having a member 17, preferably of flexible material, as a chain, cable, and cord, attached to the levers. The flexible member 17 passes over the rollers 18. Rods or bars 19 are engaged with the uprights 11 with one end, having their free ends extending downwardly. Other rods 20 are swingably engaged at a stationary point in the pit as indicated at 21 having their second ends in a position to meet the free ends of the rods 19 at the point 22. The second end of the flexible member is engaged at this point to both rods, by a common bolt or any other similar suitable means. The operating of the lever 13 then naturally produces a useful effect on the joint 22. This joint of the two rods 19 and 20 is naturally drawn towards the roller 18, thereby practically folding the rods to the position indicated at 23, the point 21 being stationary and the rod 19 naturally causing the upright 11 to move in the direction towards the point 21 thereby tilting the track members. A hook member 24 is provided to hold the tilted track in this position as long as desirable. A flexible member 25 is in engagement with the hook-member 24 having a handle 26 for disengaging the hook member from the tilted track. Another hook member 27 is provided on the opposite end of the track for holding the track in normal position until a tilting is desired. Cushion members 28, made of springs or other similar suitable material are provided to lessen shocks when tilting and operating the track device.

In Fig. 2, a modified arrangement for operating the device is illustrated to show that the operating mechanism may be varied to quite an extent without materially departing from the principle of the device. In this modified form, a lever 29 is provided on the shaft 8, connected by the rod or member 30 to the lever 13, so that the movement of the lever 13 by the pressing of the automobile wheels produce a moving of the lever 29 so as to tilt the track device, as will easily be understood.

It is, of course, not necessary that the automobile which is to be placed on the device must operate the tilting mechanism of the device. If the whole device is properly balanced, it may easily be operated by a hand lever instead of the lever 13, considering the illustration in Fig. 2.

A modified form of operating mechanism for more conveniently and securely handling the device by hand is illustrated in Fig. 4. A pulley, wheel, drum, sprocket-wheel, or any other similar means 31 is provided on the shaft 8, connected by the flexible member 32 with a smaller drum or member 33, which is operated by the hand-crank 34. The proportions between the member 31 and the member 33 can naturally easily be designed so as to make a handling with this arrangement easy, as will easily be understood without further illustrations or explanations.

From the foregoing specification and the accompanying drawing it will be clear that any other vehicle may also be handled on the track of this device, though the larger part of this specification refers more specifically to handling automobiles, as long as vehicles are of a size and type that they can stand on the track.

Having thus described my invention, I claim:

1. In a scaffold for supporting vehicles, a track tiltably mounted in the ground with its surface normally flush with the surface of the ground, a pit under one of the ends of the tilting track, the supporting journals of the track being located nearer the end of the track above the pit so as to cause an automatic tilting of the track to its normal horizontal position, a number of connecting members between the foundation and the track having operating portions extending above the track into the path of approaching wheels of vehicles disposed on the track, the connecting members being arranged so that a pressing of wheels against the operating portions causes a tilting of the connected track-end so as to drop into the pit, and locking means for holding the track in the inclined and tilted position.

2. In a scaffold for supporting vehicles, a track tiltably mounted in the ground with its surface normally flush with the surface of the ground, a pit under the track, the supporting journals of the track being located nearer the end of the track above the pit so as to cause an automatic tilting of the track to its normal horizontal position, a number of connecting members between the foundation and the track having operating portions extending above the track into the path of approaching wheels of vehicles disposed on the track, the connecting members being arranged so that a pressing of wheels against the operating portions causes a tilting of the connected track-end so as to drop into the pit, locking means for holding the track in the inclined and tilted position, and releasing means to unlock the locking means.

In testimony that I claim the foregoing as my invention I have signed my name in the presence of two subscribing witnesses.

OVID LAWS, Jr.

Witnesses:
OTTO H. KRUEGER,
JESSIE A. MANOCK.